(12) United States Patent
Munaretto

(10) Patent No.: US 9,729,693 B1
(45) Date of Patent: Aug. 8, 2017

(54) DETERMINING MEASUREMENT CONFIDENCE FOR DATA COLLECTED FROM SENSORS OF A WEARABLE DEVICE

(71) Applicant: Huami Inc., Mountain View, CA (US)

(72) Inventor: Joseph Munaretto, Mountain View, CA (US)

(73) Assignee: Huami Inc., Mountain View, CA (US)

( * ) Notice: Subject to any disclaimer, the term of this patent is extended or adjusted under 35 U.S.C. 154(b) by 0 days.

(21) Appl. No.: 15/346,555

(22) Filed: Nov. 8, 2016

Related U.S. Application Data

(60) Provisional application No. 62/346,732, filed on Jun. 7, 2016.

(51) Int. Cl.
| | |
|---|---|
| *H04B 1/38* | (2015.01) |
| *H04M 1/725* | (2006.01) |
| *H04B 1/3827* | (2015.01) |
| *H04L 29/08* | (2006.01) |
| *H04W 4/04* | (2009.01) |

(52) U.S. Cl.
CPC .......... *H04M 1/7253* (2013.01); *H04B 1/385* (2013.01); *H04L 67/12* (2013.01); *H04W 4/04* (2013.01)

(58) Field of Classification Search
CPC .... H04B 1/401; H04B 1/1615; H04B 1/1607; A61B 5/721; A61B 5/7221; A61B 5/7246; A61B 5/681

USPC .............................................. 455/574, 575.6
See application file for complete search history.

(56) References Cited

U.S. PATENT DOCUMENTS

| | | | |
|---|---|---|---|
| 7,367,949 B2 | 5/2008 | Korhonen et al. | |
| 8,920,332 B2 | 12/2014 | Hong et al. | |
| 9,167,995 B2 | 10/2015 | Lamego et al. | |
| 2014/0247151 A1* | 9/2014 | Proud ................. | A61B 5/0024 340/870.02 |
| 2015/0265217 A1* | 9/2015 | Penders ................. | A61B 5/721 600/301 |
| 2017/0095182 A1* | 4/2017 | Kaur ................... | A61B 5/1455 |

* cited by examiner

*Primary Examiner* — Ping Hsieh
(74) *Attorney, Agent, or Firm* — Young Basile Hanlon & MacFarlane, P.C.

(57) ABSTRACT

Systems and methods determining measurement confidence for data collected from sensors of a wearable device are herein disclosed. In an implementation, a confidence measurement that a wearable device is worn by a user can be determined by determining that the wearable device is not in motion, comparing sample voltages collected using a light emitter to thresholds indicative of a surface on which the light is being reflected, calculating a signal quality metric using data collected using a pulse oximeter, and comparing the signal quality metric to thresholds indicative of typical biometric data measurements. Other implementations for confidence measurement can include frequency transforming signal data stored in a buffer, performing probabilistic modelling on the frequency transformed data, and determining a confidence measurement using a signal quality estimation based on the modelled data.

20 Claims, 6 Drawing Sheets

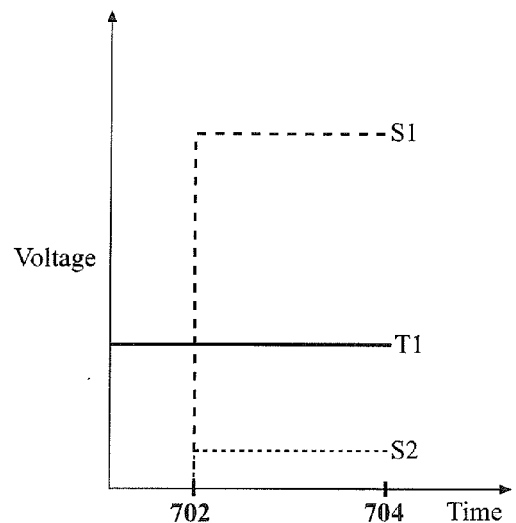
FIG. 8
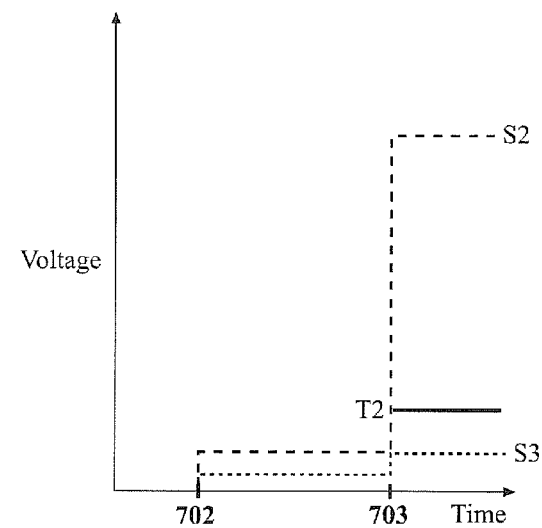
FIG. 9
FIG. 10
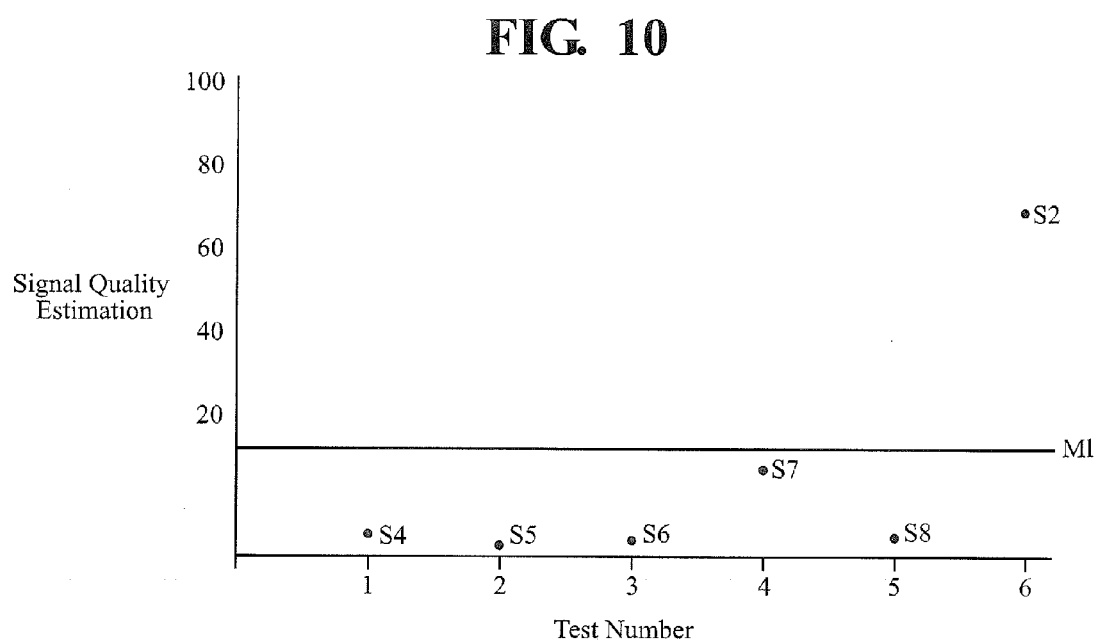

US 9,729,693 B1

DETERMINING MEASUREMENT CONFIDENCE FOR DATA COLLECTED FROM SENSORS OF A WEARABLE DEVICE

CROSS-REFERENCE TO RELATED APPLICATIONS

This application claims priority of U.S. Provisional Application Ser. No. 62/346,732 filed on Jun. 7, 2016, the content of which is herein incorporated by reference in its entirety.

TECHNICAL FIELD

The present disclosure relates in general to determining measurement confidence for data collected from sensors of a wearable device.

BACKGROUND

Persons at risk for various diseases may wish to monitor certain physiological, or biometric, data, for example, to identify disease risk factors and predict diagnoses. Tests typically performed by traditional electrocardiograph, pulse oximeter, and other devices can be performed using sensor and other computing components. Wearable devices capable of measuring biometric data are becoming increasingly commonplace in part because of their ability to use multiple biometric sensors to collect, process, and provide fast feedback for biometric measurements. However, because of hardware and/or software limitations, these devices may often process inappropriate data as biometric measurement data, which can negatively affect the confidence that the feedback provided is accurate.

SUMMARY

Disclosed herein are implementations of systems and methods for determining measurement confidence for data collected from sensors of a wearable device.

In an implementation, a method is provided for determining measurement confidence for data collected from a sensor of a wearable device. The method comprises determining that a first sample voltage of the wearable device is less than a first threshold voltage. In response to determining that the first sample voltage is less than the first threshold voltage, determining that a second sample voltage of the wearable device is greater than a second threshold voltage. In response to determining that the second sample voltage is greater than the second threshold voltage, calculating a signal quality metric indicative of data measured by the sensor of the wearable device over a test period. In response to calculating the signal quality metric indicative of the data measured by the sensor of the wearable device over the test period, determining that the signal quality metric is greater than a measurement threshold indicative of a minimum signal quality metric. In response to determining that the signal quality metric is greater than the measurement threshold indicative of the minimum signal quality metric, determining that the wearable device is worn by a user.

In another implementation, an apparatus is provided comprising a wearable device. The wearable device comprises a body configured to be coupled to a portion of a user, a sensor coupled to the body, a non-transitory memory, and a processor configured to execute instructions stored in the non-transitory memory. The instructions determine that a first sample voltage of the wearable device is less than a first threshold voltage. In response to a determination that the first sample voltage is less than the first threshold voltage, determine that a second sample voltage of the wearable device is greater than a second threshold voltage. In response to a determination that the second sample voltage is greater than the second threshold voltage, calculate a signal quality metric indicative of data measured by the sensor over a test period. In response to a calculation of the signal quality metric indicative of the data measured by the sensor over the test period, determine that the signal quality metric is greater than a measurement threshold indicative of a minimum signal quality metric. In response to a determination that the signal quality metric is greater than the measurement threshold indicative of the minimum signal quality metric, determine that the wearable device is worn by a user.

In yet another implementation, a system is provided comprising a wearable device and an analysis component. The wearable device comprising a body configured to be coupled to a portion of a user, and a sensor coupled to the body. The analysis component comprising a non-transitory memory and a processor configured to execute instructions stored in the non-transitory memory. The instructions determine that a first sample voltage of the wearable device is less than a first threshold voltage. In response to a determination that the first sample voltage is less than the first threshold voltage, determine that a second sample voltage of the wearable device is greater than a second threshold voltage. In response to a determination that the second sample voltage is greater than the second threshold voltage, calculate a signal quality metric indicative of data measured by the sensor over a test period. In response to a calculation of the signal quality metric indicative of the data measured by the sensor over the test period, determine that the signal quality metric is greater than a measurement threshold indicative of a minimum signal quality metric. In response to a determination that the signal quality metric is greater than the measurement threshold indicative of the minimum signal quality metric, determine that the wearable device is worn by a user.

Details of these implementations, modifications of these implementations and additional implementations are described below.

BRIEF DESCRIPTION OF THE DRAWINGS

The description herein makes reference to the accompanying drawings, where like reference numerals refer to like parts throughout the several views.

FIG. 8 is a graph comparing first sample voltages for a wearable device that is facing sunlight and for a wearable device that is being worn by a user.

FIG. 9 is a graph comparing second sample voltages for a wearable device that is facing a dark room and for a wearable device that is being worn by a user.

FIG. 10 is a graph showing signal quality metric results for a wearable device in various scenarios.

DETAILED DESCRIPTION

Figure 1:
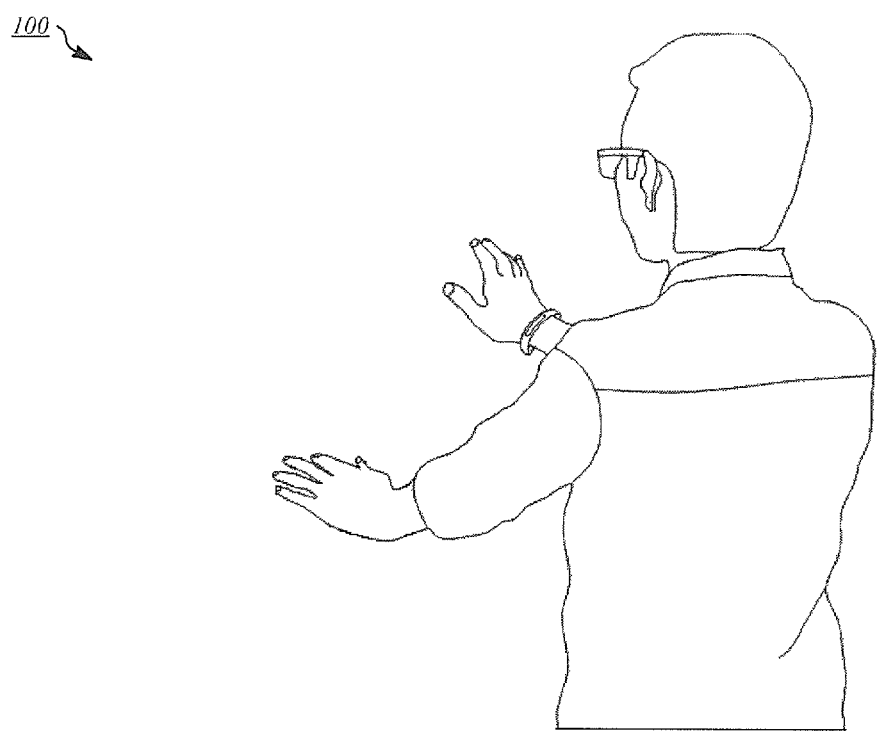
FIG. 1 is an illustration showing an implementation of a user wearing a wearable device configured to measure biometric data.

Generally, the confidence of data collected or otherwise generated from sensors can be measured, for example, to determine whether the data is accurately representative of an individual's physiological condition. Data having a high confidence can be considered as accurate biometric data for the individual, whereas data having a low confidence may instead be considered inaccurate with respect to the individual's biometrics. For example, sensor data having a low confidence measure may be noise collected along with minor physiological signals. As another example, sensor data having a low confidence measure may have been collected in error, such as where the individual is not interacting with a device through which the data was collected.

Confidence measurements are important for processing and presenting correct information about collected data. In the context of a wearable device comprising sensors for collecting biometric data of a user wearing the wearable device, confidence measurements can validate the results of the data processing. In their absence, sensor data that does not actually represent the user's biometrics may be processed as if the data were accurately representative. For example, heart rate estimation using a photoplethysmography (PPG) sensor can be difficult where there is a low signal to noise ratio. The signal can be decreased by physical qualities of the user, such as a darker skin tone, and noise can be increased where the user is in motion (e.g., via movement-induced motion artifacts collected within the data). If the signal to noise ratio is low, the confidence that the sensor data accurately represents the user's heart rate may also be low.

While some solutions may exist for measuring sensor data confidence, they face shortcomings in the manners by which the sensor data is processed. For example, the solutions may apply parametric models for determining whether the confidence measurement in the collected sensor data is high; however, they would be incapable of measuring confidence of real-time biometric data, which is non-parametric in nature. Additionally, the solutions may be incapable of determining whether the corresponding devices are being worn or used by an individual. For example, a PPG sensor that is facing an inanimate object, which can mirror light reflection of human skin, may collect data under the assumption that it is actually facing human skin. In that case, a confidence measurement would be useful to indicate that the data is not accurately representative of the user's biometrics. In contrast, implementations of the present disclosure include a wearable device having sensors configured to collect or otherwise generate biometric data of a user wearing the wearable device and operations for processing the data collected or generated by the sensors. In an implementation, data collected in real time (or near real time, as permitted based on applicable hardware configurations) can be frequency transformed into non-parametric data sets for probabilistic modeling. In an implementation, the modeled data can be used to estimate a signal quality of the data, and a measurement confidence that the data is accurately representative of the intended biometric condition can be determined using the signal quality estimate. The implementations of the present disclosure can be used to measure confidence in biometric data collected by sensors of a wearable device, which can be extended, for example, to determining a confidence that the wearable device was being worn by a user when the data was collected or generated by the sensors.

The systems and methods of the present disclosure address problems particular to wearable devices, particularly, for example, the confidence in measurements collected from sensors of the wearable devices. These confidence-specific issues are solved by the disclosed implementations. The nature of wearable devices capable of processing biometric measurement data necessitates the development of new ways to measure the confidence that the biometric measurements collected by sensors is accurate in order to process and provide feedback to a user regarding actual biometric data, as opposed to, for example, non-biometric data or noise included in a biometric measurement signal.

FIG. 1 is an illustration 100 showing an implementation of a user wearing a wearable device configured to measure biometric data. In an implementation, and as shown in the figure, a wearable device can include or otherwise be a wristband worn around a user's wrist. Signal data indicative of the user's biometrics can be generated (e.g., collected, identified, etc.) by sensors of the wearable devices. The signal data can thereafter be processed on the wearable device to display processed biometric data to a user, for example, heart rate or pulse oximetry data. The raw signal data or the processed signal data can be used to determine a confidence that the data is accurate with respect to the biometric measurements represented by the data. For example, as shown in the figure, a wearable device can include a light emitter, such as a light emitting diode in communication with a transceiver, for measuring blood-oxygen levels of a user as an integrated pulse oximeter feature. The light emitter, either individually or in combination with other sensors of the wearable device, can collect measurement data that, when processed, can indicate whether the wearable device was being worn by a user when the measurements were collected and thus determine a confidence as to the accuracy of the collected measurement data.

As used throughout this disclosure, a wearable device can be implemented as any suitable wearable device, such as a brace, wristband, arm band, leg band, ring, headband, or the like. In an implementation, a wearable device can comprise a body configured to be coupled to a portion of a user. For example, the body can be a band wearable about a user's wrist, ankle, arm, leg, or any other suitable part of the user's body. Various components for the operation of the wearable device, such as those discussed below with respect to FIGS. 3 and 5, may be disposed within or otherwise coupled to portions of the body. In an implementation wherein the body of the wearable device comprises a band, a securing mechanism can be included to secure the band to the user. The securing mechanism can comprise, for example, a slot and peg configuration, a snap-lock configuration, or any other suitable configuration for securing the band to the user.

Illustration 100 represents only a single implementation of a wearable device configured to measure biometric data and determine confidence in the measurements. For example, other implementations may include, without limitation, signal data being communicated from the wearable device to a computing device configured to process the signal data. The computing device can be implemented as any suitable computing device or devices, such as one or more mobile telephones, tablet computers, laptop computers, notebook computers, desktop computers, video game consoles, televisions, server computers, mainframe computers, computer workstations, or the like. In an implementation, a computing device can comprise instructions executable by a processor for processing sensor data originating from a wearable device. In an implementation, a computing device can comprise instructions for communicating data received from a wearable device to another device, such as a second wearable device, a second computing device, etc. For example, in an implementation wherein the computing device is a network device, such as a router, the computing device can receive data from a wearable device and communicate the data to another computer configured to process the data.

In an implementation, the wearable device and the computing device can communicate with one another. Any type of system can be used to facilitate this communication, including, without limitation, wired or wireless versions (as applicable) of Internet, intranet, Ethernet, WiFi, Bluetooth, radio frequency, near field communication (NFC), code division multiple access (CDMA), global system for mobile communications (GSM), long-term evolution (LTE), or the like. The communication can be over a wired or wireless network using routers, switches relays, servers, or the like for connecting the devices. In an implementation, the network used for facilitating communication between the devices can be a cloud computing environment. In an implementation, the network can be a local area network, Internet of Things (IoT) network, machine-to-machine network, or the like.

Figure 2:
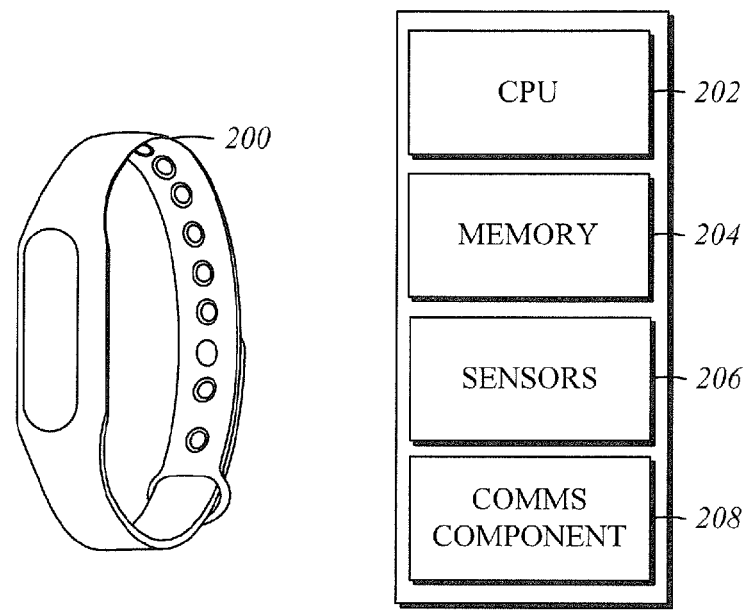
FIG. 2 is a diagram of an implementation of a wearable device usable within implementations of the disclosure.

FIG. 2 is a diagram of an implementation of a wearable device 200 usable within implementations of the disclosure. Wearable device 200 can be implemented by one or more wearable devices, such as the implementations of the wearable device discussed above with respect to FIG. 1. In an implementation, wearable device 200 comprises CPU 202, memory 204, sensors 206, and communications component 208. One example of CPU 202 is a conventional central processing unit. CPU 202 may include single or multiple processors each having single or multiple processing cores. Alternatively, CPU 202 may include another type of device, or multiple devices, capable of manipulating or processing information now-existing or hereafter developed. Although implementations of wearable device 200 can be practiced with a single CPU as shown, advantages in speed and efficiency may be achieved using more than one CPU.

Memory 204 can comprise random access memory device (RAM) or any other suitable type of storage device. Memory 204 may include executable instructions and data for immediate access by CPU 202, such as data generated and/or processed in connection with sensors 206. Memory 204 may include one or more DRAM modules such as DDR SDRAM. Alternatively, memory 204 may include another type of device, or multiple devices, capable of storing data for processing by CPU 202 now-existing or hereafter developed. CPU 202 may access and manipulate data in memory 204 via a bus.

Sensors 206 can be one or more sensors disposed within or otherwise coupled to wearable device 200, for example, for identifying, detecting, determining, or otherwise generating signal data indicative of measurements associated with wearable device 200 and/or a user wearing wearable device 200. In an implementation, sensors 206 can comprise one or more electromyography sensors, accelerometers, cameras, light emitters, touch sensors, or the like. The accelerometers can be three-axis, six-axis, nine-axis or any other suitable accelerometers. The cameras can be RGB cameras, infrared cameras, monochromatic infrared cameras, or any other suitable cameras. The light emitters can be infrared light emitting diodes (LED), infrared lasers, or any other suitable lights. Implementations of sensors 206 can include a single sensor, one of each of the foregoing sensors, or any combination of the foregoing sensors. In an implementation, the signal data can be identified, detected, determined, or otherwise generated based on any single sensor or combination of sensors included in wearable device 200.

Communications component 208 can be a hardware or software component configured to communicate data (e.g., measurements, etc.) from sensors 206 to one or more external devices, such as another wearable device or a computing device, for example, as discussed above with respect to FIG. 1. In an implementation, communications component 208 comprises an active communication interface, for example, a modem, transceiver, transmitter-receiver, or the like. In an implementation, communications component 208 comprises a passive communication interface, for example, a quick response (QR) code, Bluetooth identifier, radio-frequency identification (RFID) tag, a near-field communication (NFC) tag, or the like. Implementations of communications component 208 can include a single component, one of each of the foregoing types of components, or any combination of the foregoing components.

Wearable device 200 can also include other components not shown in FIG. 2. For example, wearable device 200 can include one or more input/output devices, such as a display. In an implementation, the display can be coupled to CPU 202 via a bus. In an implementation, other output devices may be included in addition to or as an alternative to the display. When the output device is or includes a display, the display may be implemented in various ways, including by a LCD, CRT, LED, OLED, etc. In an implementation, the display can be a touch screen display configured to receive touch-based input, for example, in manipulating data output to the display.

Figure 3:
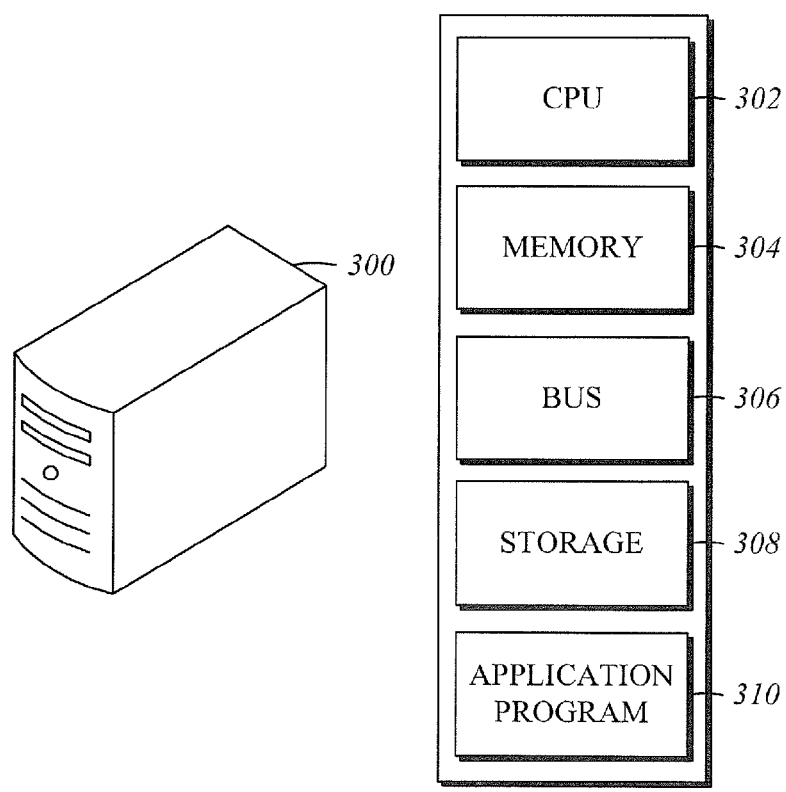
FIG. 3 is a diagram of an implementation of a computing device usable within implementations of the disclosure.

FIG. 3 is a diagram of an implementation of a computing device 300 usable within implementations of the disclosure. Computing device 300 can be implemented in connection with one or more wearable devices, such as the implementations of the wearable devices discussed above with respect to FIGS. 1 and 2. As with the CPU 202 of FIG. 2, one example of CPU 302 is a conventional central processing unit. CPU 302 may include single or multiple processors each having single or multiple processing cores. Alternatively, CPU 302 may include another type of device, or multiple devices, capable of manipulating or processing information now-existing or hereafter developed. Although implementations of computing device 300 can be practiced with a single CPU as shown, advantages in speed and efficiency may be achieved using more than one CPU.

As with the memory of FIG. 2, memory 304 can comprise RAM or any other suitable type of storage device. Memory 304 may include executable instructions and data for immediate access by CPU 302. Memory 304 may include one or more DRAM modules, such as DDR SDRAM. Alternatively, memory 304 may include another type of device, or multiple devices, capable of storing data for processing by CPU 302 now-existing or hereafter developed. CPU 302 may access and manipulate data in memory 304 via bus 306.

Storage 308 can include executable instructions along with other data. Examples of executable instructions may include, for example, an operating system and one or more application programs for loading in whole or part into memory 304 and to be executed by CPU 302. The operating system may be, for example, Windows, Mac OS X, Linux, or another operating system suitable to the details of this disclosure. Storage 308 may comprise one or multiple devices and may utilize one or more types of storage, such as solid state or magnetic. Application program 310 can be executable instructions for processing signal data communicated from one or more wearable devices, determining a measurement confidence for the signal data, or both.

Computing device 300 can also include other components not shown in FIG. 3. For example, computing device 300 can include one or more input/output devices, such as a communications component and a display. In an implementation, the communications component and/or display can be coupled to CPU 302 via bus 306. In an implementation, communications component comprises an active communication interface, for example, a modem, transceiver, transmitter-receiver, or the like. In an implementation, the communications component can be a passive communication interface, for example, a quick response (QR) code, Bluetooth identifier, radio-frequency identification (RFID) tag, a near-field communication (NFC) tag, or the like. Implementations of the communications component can include a single component, one of each of the foregoing types of components, or any combination of the foregoing components. In an implementation, other output devices may be included in addition to or as an alternative to the display. When the output device is or includes a display, the display may be implemented in various ways, including by a LCD, CRT, LED, OLED, etc. In an implementation, the display can be a touch screen display configured to receive touch-based input, for example, in manipulating data output to the display.

Figure 4:
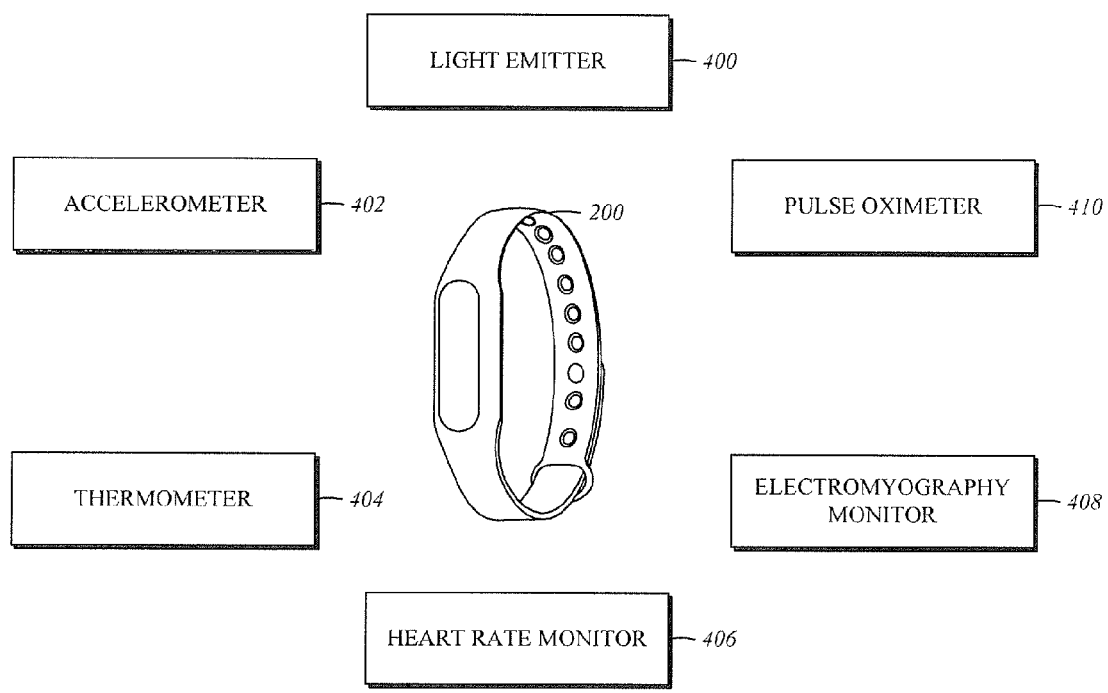
FIG. 4 is a diagram of an implementation of sensors of a wearable device.

FIG. 4 is a diagram of an implementation of sensors includable within a wearable device, such as wearable device 200. It is understood that the sensors shown in FIG. 4 are by example and that any sensors configurable with wearable devices can feasibly be used for the purposes discussed throughout this disclosure. Further, implementations of a wearable device usable for the purposes discussed throughout this disclosure may include one or more of the sensors shown in FIG. 4 and/or one or more sensors not shown in FIG. 4 or otherwise discussed in this disclosure. In an implementation, wearable device 200 may include a light emitter 400 (e.g., a light emitting diode in communication with a transceiver), an accelerometer 402 (e.g., a three, six, nine, or other axis accelerometer), a thermometer 404, a heart rate monitor 406, an electromyography monitor 408, and a pulse oximeter 410 (to the extent different from light emitter 400). Sensors of wearable device 200 can thus be used to measure biometrics including, without limitation, blood oxygen levels, breathing patterns, user and/or device movement, body temperature, muscle activity, heart rate, heart rate variability, or the like. In an implementation, each sensor can be coupled to wearable device 200 as its own distinct component. In an implementation, one or more sensors can be coupled to wearable device 200 as a compound component.

Figure 5:
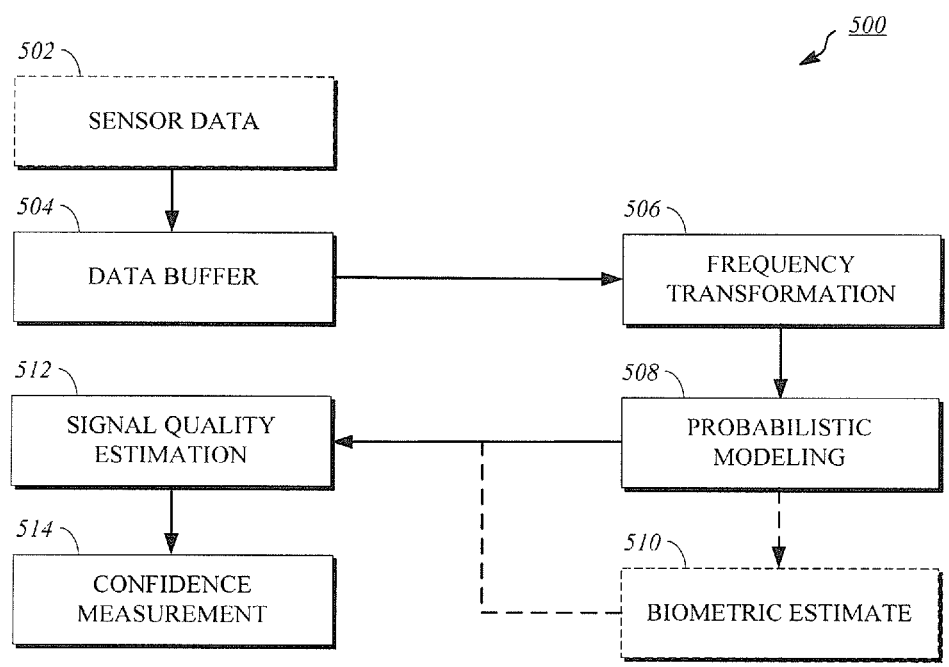
FIG. 5 is a block diagram of an implementation of estimating a signal quality of biometric data for determining a confidence measurement.

FIG. 5 is a block diagram 500 of an implementation of estimating a signal quality of biometric data for determining a confidence measurement. Implementations of block diagram 500 can be performed entirely on a wearable device on which the sensor data is collected or generated, or on another wearable device and/or a computing device in communication with one or more wearable devices. For example, the sensor data processing aspects of block diagram 500 can be performed by instructions executable on the computing device. In an implementation, portions of block diagram 500 can be performed by instructions executable on the computing device and/or one or more other devices, such as a wearable device.

In an implementation, sensor data 502 is collected or otherwise generated by sensors of a wearable device. For example, sensor data 502 can comprise one or more of PPG data, EMG data, accelerometer data, heart rate data, or the like, collected by or otherwise generated using one or more sensors included within or otherwise coupled to the wearable device. In an implementation, sensor data 502 can comprise other or additional data based on the particular implementations of the sensors coupled to or otherwise operated in connection with the wearable device.

A confidence measurement can be estimated periodically, for example, every second, or non-periodically. In an implementation, biometric data collected or otherwise generated by sensors of a wearable device can be processed in discrete time intervals. In an implementation, sets of biometric data can be stored in a data buffer 504 for processing, which data buffer can have a predetermined size. For example, a most recent ten seconds worth of biometric data can be processed as a set for estimating a confidence measurement. In an implementation, data comprising a set can be frequency transformed 506, for example, using a short term Fourier transform, discrete cosine transform, discrete wavelet transform, or any other transformation based on another set of orthonormal basis functions. Implementations for performing frequency transformation on sensor data are discussed below with respect to FIG. 6.

In an implementation, in response to the biometric data being frequency transformed, the resulting spectral distribution can be probabilistically modeled 508, for example, by being converted into a discrete probability density function, which can be multiplied by several conditional probabilities. For example, the conditional probabilities can account for one or more of motion artifact compensation, process model predictions, or any other prediction from an additional measurement or model. In an implementation, a posterior predictive function can be indicative of the multiplied form of the discrete probability density function. Implementations for probabilistic modeling are discussed below with respect to FIG. 6.

In an implementation, signal quality can be estimated 512 based on the posterior predictive function. For example, the signal quality can be estimated by calculating a ratio of the maximum of the posterior predictive function to its standard deviation. As another example, the signal quality can be estimated using Shannon entropy, wherein the negative of the summation of the posterior predictive function is multiplied by its logarithm. In response to estimating the signal quality, the estimated value can be normalized based on various factors, such as the signal type and/or user preferences defined for tuning the algorithm. In an implementation, the normalized value can be in a range of zero to one. Other data, such as biometric estimates 510, may be used for estimating signal quality based, for example, on the type of biometric condition intended to be measured. For example, where the sensors are being used to measure heart rate data, biometric estimate 510 can include additional metrics for indicating appropriate values usable for estimating signal quality. Implementations for signal quality estimation are discussed below with respect to FIG. 6.

Once the signal quality value is normalized, it can be used for estimation and classification, for example, in determining a confidence measurement 514. For example, the value can be used as a gain factor in Bayesian filtering, wherein the estimate can equal the sum of the measurement multiplied by the signal quality value and the model multiplied by one minus the signal quality value. In an implementation, the signal quality value can be used as a discriminate classification feature for determining whether a wearable device including a PPG sensor (e.g., a PPG device) is being worn by a user. For example, values below a threshold with no movement can be used to determine that the wearable device is not being worn by the user. In an implementation, the signal quality value can be used to classify low motion activities, for example, cycling. For example, where data collected from an accelerometer is sufficiently low so as to indicate a lack of user movement, if the signal quality value is above a certain threshold, then the movement can be determined to be cyclical (e.g., the user can be considered to be bicycling).

Further implementations of the disclosure will now be described with reference to FIGS. 6 and 7. The steps, or operations, of any method, process, or algorithm described in connection with the embodiments disclosed herein may be embodied directly in hardware, firmware, software executed by hardware, circuitry, or a combination of these. Broadly, methods 600 and 700 of FIGS. 6 and 7, respectively, can be used to perform certain processing and analysis as discussed above with respect to FIG. 5. In an implementation, methods 600 and/or 700 may be executed using one or more machines and hardware such as the equipment of FIGS. 1 through 4. One or both of methods 600 or 700 can be performed, for example, by executing a machine-readable program of Javascript, C, or other such instructions. In an implementation, one or both of methods 600 or 700 can be performed by a wearable device, such as wearable device 200 of FIG. 2, a computing device, such as computing device 300 of FIG. 3, and/or by one or more other devices in communication with the wearable device or the computing device.

For ease of explanation, methods 600 and 700 are depicted and described as a series of operations. However, operations in accordance with this disclosure may occur in various orders and/or concurrently. Additionally, operations in accordance with this disclosure may occur with other operations not presented and described herein. Furthermore, not all illustrated operations may be required to implement a method in accordance with the disclosed subject matter.

Figure 6:
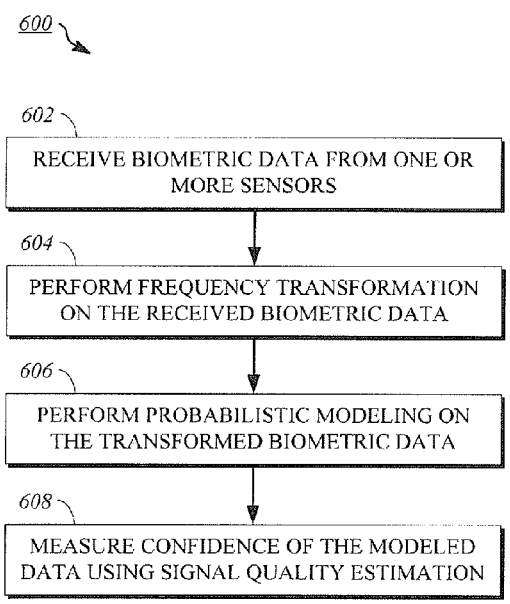
FIG. 6 is a flowchart showing an implementation of a method for determining measurement confidence for data collected from sensors of a wearable device.

FIG. 6 is a flowchart showing an implementation of a method 600 for determining measurement confidence for data collected from sensors of a wearable device. At operation 602, sensor data intended to be indicative of a user's biometric data can be collected or otherwise generated using sensors of a wearable device. In an implementation, collecting the sensor data can include one or more wearable device sensors receiving physiological measurements of the user and storing them, temporarily or otherwise, for further processing. In an implementation, generating the sensor data can include a processor of or otherwise in communication with the wearable device executing instructions for generating data based on measurements taken by the wearable device sensors. In an implementation where the sensor data derives from multiple sensors, the sensor data can be collected or otherwise generated at the same or near simultaneous time (as permitted by applicable hardware configurations), substantially the same time, or at times proximate to one another. In an implementation, operation 602 can also include storing, parsing, dividing, or otherwise preparing a set of the sensor data within a buffer, which buffer can define a discrete time interval from which collected sensor data is to be processed. In an implementation, operation 602 can also include applying a filter to the sensor data to remove data outliers, which may, for example, represent portions of the sensor data that are not considered relevant for measuring confidence. In an implementation, the first filter can be a sliding-window-based filter, such as a sliding-window-based average filter or a sliding-window-based median filter.

At operation 604, a frequency transformation is performed with respect to the sensor data, for example, from a window of the buffer referenced above in operation 602. In an implementation, performing the frequency transformation can include applying one or more temporal and/or spatial frequency transforms to the sensor data. In an implementation, the frequency transformation can be performed as part of a feature extraction process for isolating data features usable for measuring confidence of the data collected or otherwise generated by the sensors of the wearable device. The features associated with temporal frequency transforms can include temporal mean features, feature variations within specified or unspecified time windows, local minimum temporal features, local maximum temporal features, temporal variances and medians, mean-crossing rates, and the like. The temporal frequency transform features can be identified, for example, based on a correlation between sensors and/or wearable devices. Separately, the features associated with spatial frequency transforms can include wavelet features, Fast Fourier transform features (e.g., peak positions), discrete cosine transform features, arithmetic cosine transform features, Hilbert-Huang transform features, spectrum sub-band energy features or ratios, and the like. The spatial frequency transform features can also include spectrum entropy, wherein low entropy can be discerned where the signal is clean (e.g., based on inactivity or stationarity, for example, where a good signal quality is detected for a heart rate measurement) indicative of a uniform data distribution and high entropy can be discerned where the signal is noise (e.g., based on activity or other movement) indicative of a non-uniform data distribution. In an implementation, performing the frequency transformation can include converting the received sensor data into a non-parametric form usable for further processing.

At operation 606, probabilistic modeling can be performed on the transformed sensor data. In an implementation, performing probabilistic modeling can include determining variations in non-parametric sensor data and modeling the data based on those variations. In an implementation where data previously collected or otherwise generated has been retained for later use, for example, as a reference for comparing or modeling newly collected or generated sensor data, the previous data can be referenced for performing the probabilistic modeling. In an implementation, and because the sensor data collected or generated at operation 602 may be collected or generated in real time (e.g., simultaneous or proximate to a time at which the corresponding physiological conditions occurred, as permitted by applicable hardware configurations), probabilistic modeling may not include modeling sensor data that is parametric (e.g., already fit to or otherwise characterized using a model), for example, where it was recorded in the past and not collected or generated in real time (or near real time). In an implementation, operation 606 can include de-noising the frequency transformed sensor data, for example, by removing peak values from the data.

At operation 608, a confidence in the accuracy of the modeled sensor data as comprising biometric information can be measured. In an implementation, measuring the confidence of the modeled sensor data is performed using signal quality estimation, wherein the modeled sensor data is converted to determine one or more signal quality metrics. In an implementation, signal quality estimation can include a smoothing function for normalizing the modeled sensor data. In an implementation, once the data is in an appropriate form, a signal to noise ratio can be determined for indicating a quality of the sensor data. Normalizing the data and/or determining the signal to noise ratio can include comparing the modeled sensor data to data known to be accurately representative of the applicable biometrics being measured by the sensors. Based on the signal quality estimation, a confidence measurement in the sensor data can be determined. For example, the confidence measurement can be high where the signal quality estimation estimates a high signal quality.

Figure 7:
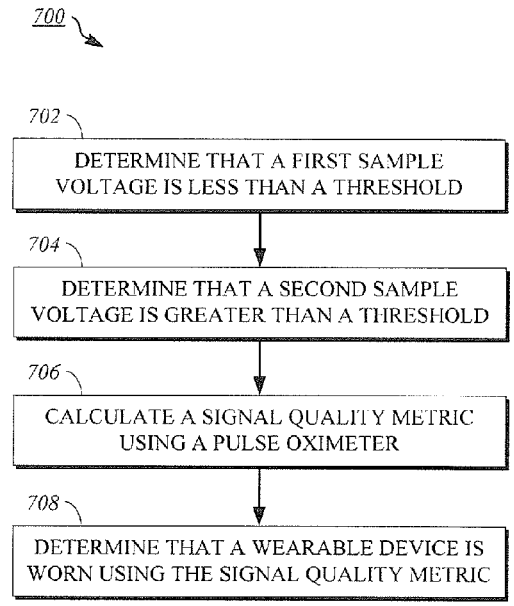
FIG. 7 is a flowchart showing an implementation of a method for using sensors to determine whether a wearable device is worn by a user.

FIG. 7 is a flowchart showing an implementation of a method 700 for using sensors to determine whether a wearable device is worn by a user. Method 700 can be characterized in some uses as a multi-stage method for detecting a wrist-on/wrist-off condition of a wearable device, for example, where the wearable device comprises a wristband form. The determination can be made using thresholds indicative of minimum qualities for collecting biometric data and measuring an adequate confidence of same.

At operation 702, it is determined whether a first sample voltage is less than a threshold associated with the first sample voltage. For example, a sample voltage from a photodiode of a light emitter can be measured before the photodiode is powered on (e.g., while the light emitter is in a non-operational state). In an implementation, the threshold associated with the first sample voltage can be used to determine whether the sensor is facing a bright light source, for example, the sun, an artificial light, etc. If the first sample voltage is of a value exceeding the threshold, it can be determined that the wearable device is not being worn by the user.

FIG. 8 is a graph that illustrates operation 702 comparing a first scenario S1, where the wearable device facing sunlight instead of being worn by the user, and a second scenario S2, where the wearable device is being worn by the user. The first sample voltage of the second scenario S2 does not exceed threshold T1. The first sample voltage of the first scenario S1 exceeds threshold T1. Consequently, it can be determined that the wearable device is not being worn by the user in the first scenario S1.

Turning back to FIG. 7, operation 702 can include, in an embodiment, using an accelerometer of the wearable device to determine whether the wearable device has not been in motion for some period of time, such as a threshold duration that may be defined by default or configured by a user. For example, if the accelerometer detects motion within ten seconds of a given measurement time, the accelerometer can be used to determine that the device has been in motion within the threshold duration. In this case, it may not be known whether the device is being worn or otherwise moved (e.g., a user is picking it up and placing it somewhere else). However, if the accelerometer determines that the wearable device has not been in motion within the threshold duration, it may be because the wearable device is not being worn by the user or because the user simply has not moved while wearing the wearable device for longer than the threshold duration. Method 700 can generally be used to confirm the former. In an implementation, determining whether the wearable device has not been in motion for a period of time can occur before the determining whether the first sample voltage is greater than the threshold.

At operation 704, it is determined whether a second sample voltage is greater than a threshold associated with the second sample voltage. The threshold associated with the second sample voltage can be the same or different than the threshold associated with the first sample voltage. The second sample voltage from the photodiode can be measured after the photodiode is powered on (e.g., while the light emitter is in an operational state). In an implementation, the threshold associated with the second sample voltage can be used to determine whether the sensor is facing a dark environment, such as human skin. If the second sample voltage is of a value not exceeding the threshold, it can be determined that the wearable device is not being worn by the user.

FIG. 9 is a graph that illustrates operation 704 comparing the second scenario S2, where the wearable device is being worn by the user, and a third scenario S3, where the wearable device is facing a dark room instead of being worn by the user. The second sample voltage of the second scenario S2 exceeds threshold T2. The second sample voltage of the third scenario S3 does not exceed threshold T2. Consequently, it can be determined that the wearable device is not being worn by the user in the third scenario S3.

At operation 706 in FIG. 7, if the wearable device has not yet been determined to not be worn by the user (e.g., based on one or more threshold determinations), a signal quality metric can be calculated using a pulse oximeter, for example, as a sensor of the wearable device. In an implementation, the signal quality metric can be indicative of data collected or generated using a pulse oximeter sensor over a test period, for example, a ten second window or window of other sufficient size. The signal quality metric can be processed based, for example, on operations comprising method 600.

At operation 708, it can be determined whether the wearable device is being worn by the user as the time the sensor data is collected using the signal quality metric. In an implementation, a value representative of the signal quality metric can be compared to a measurement threshold indicative of a minimum signal quality metric value. For example, a confidence measurement indicating that the wearable device is being worn may require that the signal quality metric be of at least a certain value in order for the confidence measurement to be high enough for determining that the wearable device is being worn. If the signal quality metric value is less than the measurement threshold, it can be determined that the wearable device may not have been worn at the time the sensor data was collected (e.g., at operation 706). However, if the signal quality metric value meets or exceeds the measurement threshold, it can be determined that the wearable device is being worn. Method 700 can thus be used to reduce or eliminate the occurrence of false positives in processing and indicating data not accurately representative of the user's physiological or biometric levels.

FIG. 10 is a graph that illustrates operation 708 by comparing the signal quality metric of the wearable device in various, known environments. The wearable device is facing a white table instead of being worn by the user in a fourth scenario S4. The wearable device is facing a mid-dark material instead of being worn by the user in a fifth scenario S5. The wearable device is facing a dark material instead of being worn by the user in a sixth scenario S6. The wearable device is facing a silver laptop instead of being worn by the user in a seventh scenario S7. The wearable device is facing a smartphone screen instead of being worn by the user in an eighth scenario S8. The signal quality metric for the fourth scenario S4, the fifth scenario S5, the sixth scenario S6, the seventh scenario S7, and the eighth scenario S8 is less than a minimum signal quality metric value M1. Consequently, it can be determined that the wearable device is not being worn by the user in the fourth scenario S4, the fifth scenario S5, the sixth scenario S6, the seventh scenario S7, and the eighth scenario S8. The signal quality metric for the second scenario S2 is greater than the minimum signal quality metric value M1. Consequently, it can be determined that the wearable device is being worn by the user in scenario S2.

While the foregoing disclosure shows a number of illustrative implementations, it will be apparent to those skilled in the art that various changes and modifications can be made herein without departing from the scope of the disclosure as defined by the appended claims. Accordingly, the disclosed implementations are representative of the subject matter which is broadly contemplated by the present disclosure, and the scope of the present disclosure fully encompasses other embodiments which may become obvious to those skilled in the art, and that the scope of the present disclosure is accordingly to be limited by nothing other than the appended claims.

All structural and functional equivalents to the elements of the above-described implementations that are known or later come to be known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Furthermore, although elements of the disclosure may be described or claimed in the singular, reference to an element in the singular is not intended to mean "one and only one" unless explicitly so stated, but shall mean "one or more." Additionally, ordinarily skilled artisans will recognize in view of the present disclosure that while operational sequences must be set forth in some specific order for the purpose of explanation and claiming, the present disclosure contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Further, any routines, platforms, or other functionality as disclosed herein associated with or implemented as software may be performed by software modules comprising instructions executable by a process for performing the respective routine, platform, or other functionality.

The foregoing description describes only some examples of implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely by example, and not mandatory; functions performed by a single system component may instead be performed by multiple components, and functions performed by multiple components may instead performed by a single component.

It is to be understood that the present disclosure is not to be limited to the disclosed implementations but, on the contrary, is intended to cover various modifications and equivalent arrangements included within the scope of the appended claims.

What is claimed is:

1. A method for determining measurement confidence for data collected from a sensor of a wearable device, comprising:
    determining that a first sample voltage of the wearable device is less than a first threshold voltage;
    in response to determining that the first sample voltage is less than the first threshold voltage, determining that a second sample voltage of the wearable device is greater than a second threshold voltage;
    in response to determining that the second sample voltage is greater than the second threshold voltage, calculating a signal quality metric indicative of data measured by the sensor of the wearable device over a test period;
    in response to calculating the signal quality metric indicative of the data measured by the sensor of the wearable device over the test period, determining that the signal quality metric is greater than a measurement threshold indicative of a minimum signal quality metric; and
    in response to determining that the signal quality metric is greater than the measurement threshold indicative of the minimum signal quality metric, determining that the wearable device is worn by a user.

2. The method of claim 1, wherein the first sample voltage is measured while a light emitter is in a non-operational state.

3. The method of claim 1, wherein the second sample voltage is measured while a light emitter is in an operational state.

4. The method of claim 1, wherein the first sample voltage is measured by a light emitter in a non-operational state and the second sample voltage is measured by the light emitter in an operational state.

5. The method of claim 1, wherein the data measured by the sensor of the wearable device over the test period comprises data measured using a pulse oximeter included in the wearable device.

6. The method of claim 1, wherein the data measured by the sensor of the wearable device over the test period comprises data measured using a photoplethysmography (PPG) sensor included in the wearable device.

7. The method of claim 1, further comprising:
determining, using an accelerometer, that the wearable device has not been in motion for a threshold duration.

8. The method of claim 7, wherein determining that the first sample voltage of the wearable device is less than the first threshold voltage is performed in response to a determination that the wearable device has not been in motion for the threshold duration is performed prior to.

9. The method of claim 1, wherein the first threshold voltage and the second threshold voltage are substantially the same.

10. The method of claim 1, wherein the first threshold voltage and the second threshold voltage are substantially different.

11. An apparatus, comprising:
a wearable device, comprising:
a body configured to be coupled to a portion of a user; and
a sensor coupled to the body;
a non-transitory memory; and
a processor configured to execute instructions stored in the non-transitory memory to:
determine that a first sample voltage of the wearable device is less than a first threshold voltage;
in response to a determination that the first sample voltage is less than the first threshold voltage, determine that a second sample voltage of the wearable device is greater than a second threshold voltage;
in response to a determination that the second sample voltage is greater than the second threshold voltage, calculate a signal quality metric indicative of data measured by the sensor over a test period;
in response to a calculation of the signal quality metric indicative of the data measured by the sensor over the test period, determine that the signal quality metric is greater than a measurement threshold indicative of a minimum signal quality metric; and
in response to a determination that the signal quality metric is greater than the measurement threshold indicative of the minimum signal quality metric, determine that the wearable device is worn by a user.

12. The apparatus of claim 11, wherein the first sample voltage is obtained using a light emitter in a non-operational state and the second sample voltage is obtained using the light emitter in an operational state.

13. The apparatus of claim 11, wherein the instructions to determine measurement confidence for data collected from the sensor further comprises instructions to:
determine, using an accelerometer coupled to the body, that the wearable device has not been in motion for a threshold duration.

14. The apparatus of claim 11, wherein the sensor is a pulse oximeter.

15. The apparatus of claim 11, wherein the sensor is a photoplethysmography (PPG) sensor.

16. A system, comprising:
a wearable device, comprising:
a body configured to be coupled to a portion of a user; and
a sensor coupled to the body; and
an analysis component, comprising:
a non-transitory memory; and
a processor configured to execute instructions stored in the non-transitory memory to:
determine that a first sample voltage of the wearable device is less than a first threshold voltage;
in response to a determination that the first sample voltage is less than the first threshold voltage, determine that a second sample voltage of the wearable device is greater than a second threshold voltage;
in response to a determination that the second sample voltage is greater than the second threshold voltage, calculate a signal quality metric indicative of data measured by the sensor over a test period;
in response to a calculation of the signal quality metric indicative of the data measured by the sensor over the test period, determine that the signal quality metric is greater than a measurement threshold indicative of a minimum signal quality metric; and
in response to a determination that the signal quality metric is greater than the measurement threshold indicative of the minimum signal quality metric, determine that the wearable device is worn by a user.

17. The system of claim 16, wherein the first sample voltage is obtained using a light emitter in the wearable device in a non-operational state and the second sample voltage is obtained using the light emitter in an operational state.

18. The system of claim 16, wherein the sensor is a pulse oximeter.

19. The system of claim 16, wherein the sensor is a photoplethysmography (PPG) sensor.

20. The system of claim 16, wherein the instructions stored in the non-transitory memory further comprise:
determine that the wearable device has not been in motion for a threshold duration.

* * * * *